United States Patent [19]
Goldstein et al.

[11] Patent Number: 5,862,184
[45] Date of Patent: Jan. 19, 1999

[54] MAPPER FOR HIGH DATA RATE TRANSMISSION THROUGH CHANNELS SUBJECT TO ROBBED BIT SIGNALLING

[75] Inventors: Yuri Goldstein; Yuri Okunev, both of Southbury, Conn.

[73] Assignee: General DataComm, Inc., Middlebury, Conn.

[21] Appl. No.: 838,367

[22] Filed: Apr. 8, 1997

Related U.S. Application Data

[63] Continuation-in-part of Ser. No. 807,955, Mar. 4, 1997, and Ser. No. 801,066, Feb. 14, 1997.

[51] Int. Cl.⁶ .................................................. H04L 27/04
[52] U.S. Cl. ............................................................ 375/295
[58] Field of Search .................................. 375/261, 295, 375/296, 298, 222, 377, 285, 242, 254; 370/523, 522

[56] References Cited

U.S. PATENT DOCUMENTS

| | | | |
|---|---|---|---|
| 4,791,654 | 12/1988 | De Marca et al. | 375/242 |
| 5,031,195 | 7/1991 | Chavillat et al. | 375/232 |
| 5,150,381 | 9/1992 | Forney et al. | 375/261 |
| 5,321,725 | 6/1994 | Paik et al. | 375/261 |
| 5,331,670 | 7/1994 | Sorbara et al. | 370/522 |
| 5,394,437 | 2/1995 | Ayanoglu et al. | 375/222 |
| 5,406,583 | 4/1995 | Dagdeviren | 375/216 |
| 5,493,586 | 2/1996 | Rownlie et al. | 375/261 |
| 5,528,625 | 6/1996 | Ayanoglu et al. | 375/222 |

FOREIGN PATENT DOCUMENTS

US95/15924  12/1995  WIPO.

OTHER PUBLICATIONS

ITU–T Recommendation V.34, Sep. 1994, "Data Communication Over the Telephone Network".

"The Capacity of PCM Voiceband Channels", Kalet, et al., IEEE Intern'l Conference on Communications '93, pp. 507–511.

"A Mathematical Theory of Communication". Bell Systems Technical Journal, 27:379–423, 623–656.

*Primary Examiner*—Tesfaldet Boojre
*Attorney, Agent, or Firm*—David P. Gordon; David S. Jacobson; Thomas A. Gallafgher

[57] ABSTRACT

A mapper for a PAM encoder is provided and includes apparatus for generating desired code levels, and a constellation matrix memory which stores indications of a plurality of different N-dimensional constellations. The plurality of different constellations are used individually or together to support a plurality of different modem data (bit) rates. In order to maximize performance in the presence of robbed bit signalling, multidimensional constellations having different numbers of points are used together in the coding of a single group of bits.

16 Claims, 1 Drawing Sheet

MAPPER FOR HIGH DATA RATE TRANSMISSION THROUGH CHANNELS SUBJECT TO ROBBED BIT SIGNALLING

This is a continuation-in-part of U.S. Ser. No. 08/807,955, filed Mar. 4, 1997 and entitled "Mapper for High Data Rate Signalling", and U.S. Ser. No. 08/801,066 filed Feb. 14, 1997 and entitled "Mapper for High Data Rate Signalling", both of which are hereby incorporated by reference herein in their entireties.

BACKGROUND OF THE INVENTION

1. Field of the Invention

The present invention relates to data communications equipment. More particularly, the present invention relates to mapping systems and methods having advantageous applications in high speed modems which are coupled to lines subject to robbed bit signalling.

2. State of the Art

With the ever-increasing importance of telecommunications for the transfer of data as well as voice, there has been a strong effort to increase data transfer rates over the telephone wires. Recently, the ITU-T adopted the V.34 Recommendation (International Telecommunication Union, Telecommunication Standardization Sector Recommendation V.34, Geneva, Switzerland 1994) which is hereby incorporated by reference herein in its entirety. The V.34 standard and subsequent amendments define modem operating speeds of 28.8 kbps up to 33.6 kbps, and the vast majority of modems being sold today adhere to the V.34 Recommendation. However, with the explosion in the use of the Internet, even at the V.34 transfer rates, downloading of large files available on the Internet can take long periods of time. Thus, recently, there has been a thrust to provide additional standards recommendations which will increase data transfer rates even further (note the TIA TR-30.1 PAM Modem ad hoc group and the ITU-T Study Group 16).

Recognizing that further increases in data rates is theoretically limited where the telecommunication network is an analog system (see C. E. Shannon, "A Mathematical Theory of Communication," *Bell System Technical Journal*, 27:379–423, 623–656 (1948)), there have been various proposals to take advantage of the fact that much of the telecommunication network is now digital. For example, U.S. Pat. No. 5,394,437 to Ayanoglu et al., U.S. Pat. No. 5,406,583 to Dagdeviren, and U.S. Pat. No. 5,528,625 to Ayanoglu et al. (all assigned to AT&T/Lucent and all of which are hereby incorporated by reference herein in their entireties) all discuss techniques which utilize the recognition that the network is mostly digital in order to increase data transmission rates to 56 kbps and higher. Similarly, Kalet et al., "The Capacity of PAM Voiceband Channels," *IEEE International Conference on Communications '93*, pages 507–511 Geneva, Switzerland (1993) discusses such a system where the transmitting end selects precise analog levels and timing such that the analog to digital conversion which occurs in the central office may be achieved with no quantization error. PCT application number PCT/US95/15924 (Publication WO 96/18261) to Townshend which is hereby incorporated by reference herein in its entirety) discusses similar techniques. All of the disclosures assume the use of PAM (pulse amplitude modulation) digital encoding technology rather than the QAM (quadrature amplitude modulation) currently used in the V.34 Recommendation. The primary difference between the AT&T technology and the Townshend reference is that the AT&T technology suggests exploiting the digital aspect of the telephone network in both "upstream" and "downstream" directions, while Townshend appears to be concerned with the downstream direction only. Thus, systems such as the "x2" technology of US Robotics which are ostensibly based on Townshend envision the use of the V.34 Recommendation-technology for upstream communications.

As will be appreciated by those skilled in the art, the technologies underlying the V.34 Recommendation, and the proposed 56 kbps modem are complex and typically require the use of high-end digital signal processors (DSPs). One of the complex tasks of the modem is the mapping of digital data into a sequence of digital signals chosen from a constellation which are converted into an analog signal by a D/A converter. Mapping typically includes utilizing a constellation. In the V.34 Recommendation, the preferred constellation is a four-dimensional constellation, whereas in the envisioned 56 kbps modems, the constellation is envisioned as a one dimensional PAM constellation which complies with $\mu$-law (A-law in Europe) requirements. According to $\mu$-law requirements which are set forth in ITU-T Recommendation G.711 which is hereby incorporated by reference herein in its entirety, the total constellation consists of 255 signal levels; 127 positive, 127 negative, and zero. Both the positive portion of the constellation and the negative portion of the constellation include eight sectors with sixteen points each (the constellation being shown in Appendix 1 hereto), with zero being a common point for both portions. As is well known in the art, the minimum distance between points in sector 1 of the constellation is a distance "2". In sector 2, the minimum distance is "4", while in sector 3, the minimum distance is "8". In the eighth sector, the minimum distance is "256".

Using the full PAM $\mu$-law constellation, theoretically, a bit rate of almost 64 kbps can be transmitted over the analog local loop to the digital network. However, the average power of such a constellation would be about −4 dBm, and the minimum distance between points would be a distance of "2". Such a large average power is undesirable when compared to the present restrictions of an average power of −12 dBm on the network; and such a minimum distance is also undesirable, with minimum distances of at least "4" and preferably "8" being considerably more desirable in reducing errors due to noise. In addition, where the modem is to be coupled to a digital transport system which utilizes robbed bit signalling (e.g., a T1 trunk) for signal control and status information between network equipment, very high bit rates are not achievable because the robbed bit signalling will introduce errors into the transmitted signal.

With the systems of the prior art, errors resulting from robbed bit signalling may be introduced in several ways. First, if the PAM constellation includes two points having adjacent codes (e.g., 10110000 and 10110001), then by robbing and changing the 1sb, a direct error is introduced. However, even if the PAM constellation does not have points with adjacent codes, the robbing and changing of a bit can introduce error because the minimum distance between points is reduced. For example, in the case of a 40 kbps data rate, where the optimal thirty-two point constellation having a minimum distance (Dmin=96) appears as follows, z1=[0,0,0,0,0,0,0,0,0,0,0,0,0,0,0]
z2=[0,0,0,0,1,0,0,0,0,0,0,0,0,0,0]
z3=[0,0,0,0,0,0,1,0,0,0,0,0,0,0,0]
z4=[0,1,0,0,0,0,0,0,1,0,0,0,0,0,1]
z5=[0,0,0,1,0,0,1,0,0,1,0,0,1,0,0,1]
z6=[0,1,0,1,0,1,0,1,0,1,0,1,0,0,0,0]
z7=[0,0,0,0,0,0,0,0,0,0,0,0,0,0,0]

z8=[0,0,0,0,0,0,0,0,0,0,0,0,0,0,0,0]
after robbed bit signalling, the constellation will be transformed into the following constellation,
z1=[0,0,0,0,0,0,0,0,0,0,0,0,0,0,0,0]
z2=[0,0,0,0,1,1,0,0,0,0,0,0,0,0,0,0]
z3=[0,0,0,0,0,0,1,1,0,0,0,0,0,0,0,0]
z4=[0,1,0,0,0,0,0,0,1,1,0,0,0,0,1,1]
z6=[0,0,1,1,0,0,1,1,1,1,1,1,0,0,1,1]
z7=[0,0,0,0,0,0,0,0,0,0,0,0,0,0,0,0]
z8=[0,0,0,0,0,0,0,0,0,0,0,0,0,0,0,0]
which has a minimum distance Dmin=32. In addition, the power of the constellation may be increased due to robbed bit signalling. As a result, while the original constellation might meet certain power requirements, the resulting signal could be in violation of the power requirements.

SUMMARY OF THE INVENTION

It is therefore an object of the invention to provide a PAM mapper for a high speed modem which accounts for robbed bit signalling.

It is another object of the invention to provide a PAM mapper which utilizes multidimensional constellations in order to optimize data rates in robbed bit signalling applications.

It is a further object of the invention to provide a PAM mapper and methods utilizing a PAM mapper which optimize signal sets based on desired average power requirements and desired minimum distances between points in the PAM constellations in the presence of robbed bit signalling.

It is an additional object of the invention to provide a PAM mapper which is simple to implement and which does not require large computing and memory resources.

In accord with the invention, a mapper for a PAM encoder is provided and includes means for generating desired code levels, and a constellation matrix memory which stores indications of a plurality of different N-dimensional constellations (N being a positive integer), wherein at least one of the different stored constellations is of different dimension than another of the stored constellations. As will become apparent hereinafter, the plurality of different constellations are used individually or together to support a plurality of different modem data (bit) rates. In order to maximize performance in the presence of robbed bit signalling, different multidimensional constellations are grouped and used together. For purposes herein, the term "multidimensional constellation" refers to constellations having other than $2^c$ points (where c is a positive integer), where a group or subgroup of bits is used to select sequentially more than one point from that constellation, or from that constellation in conjunction with at least one other constellation.

In addition to the means for generating desired code levels and constellation matrix memory, the mapper preferably includes a logic block which receives incoming bits of information, groups the bits as a function of the desired or agreed upon data rate, and provides at least some of each group of bits to the means for generating desired code levels. In the case of robbed bit signalling, the means for generating desired code levels uses the received group of bits to choose at least one point from a first multidimensional constellation and at least another point from a second multidimensional constellation. Each chosen constellation point is then used in generating the desired code levels. It should be appreciated that in most circumstances, for the octet from which a bit is to be robbed, the number of bits grouped together will be decreased, thereby decreasing the average data rate.

However, by carefully choosing the multidimensional constellations being utilized, the data rate will not need to be decreased too substantially.

As disclosed in the parent applications hereto, one manner of selecting constellation points of an N-dimensional constellation comprises, taking a group of x bits (where $2^{x-N} \leq L^N$ with L=the number of positive points or indications in the constellation), using N of the x bits as the sign bits for the N output symbols, and dividing the value represented by the x-N remaining bits by $L^{N-m}$ (where m is a variable which takes values from 1 to N-1 sequentially) to obtain quotients and remainders. The first quotient is used to select a first constellation point value which is used for generating a first code level output. If N-m equals one, the first remainder is used to select another constellation point. However, if N-m is greater than one, m is increased by one, and the remainder is divided by $L^{N-m}$ to obtain a second quotient and a second remainder, with the second quotient being used to select a second constellation point value. If the N-m is equal to one, the second remainder is used to select a third constellation point value; otherwise, m is again increased and the remainder divided by $L^{N-m}$. The process is continued until N-m equals one, and the last remainder is used to select the N'th constellation point value.

Where robbed bit signalling is involved, the preferred manner of selecting constellation points is slightly modified as points are preferably chosen from two different multidimensional constellations. Where one or more bits are to be robbed, instead of grouping together x bits, in one embodiment of the invention, x-y bits are grouped together (thereby reducing the average data rate), where y is the number of bits to be robbed, and where $2^{x-y-N} \leq (L^{N-y})(K^y)$ with L=the number of positive points or indications in the first multidimensional constellation, and K=the number of positive points or indications in the second multidimensional constellation. As in the non-robbed bit case, N bits are used as the sign bits for the N output symbols. The value represented by the x-y-N remaining bits are then divided by $(L^{N-y-m})(K^{y-p})$, where m is a variable which takes values from 0 or 1 to N-y-1 sequentially, where p is a variable which takes the value from 0 or 1 to y-1 sequentially, and where initially, m+p=1, to obtain quotients and remainders. Whether m or p is incremented is dependent upon the sequence of the octets to be generated; i.e., from which generated octet a bit is to be robbed. Also, it should be noted that where N-y-m is zero, division will only be by $K^{y-p}$. Similarly, it should be noted that the robbed bit divisor $(L^{N-y-m})(K^{y-p})$ reduces to the divisor $L^{N-m}$ discussed above where no bits are to be robbed; i.e., y=0.

In the case of the use of a 2D constellation, where a bit is being robbed, it will be appreciated that N-y-m will be zero or one (depending upon whether a bit is robbed from the first or second octet), so that the value of the x-y-N bits will be divided by L or K to obtain a first quotient and a first remainder. Where m is initially zero (the robbed bit is taken from the second octet; i.e., divide by K), the quotient is then used to select a first constellation point value from the first constellation having L points while the remainder is used to select another constellation point value from the second constellation having K points. Where the robbed bit is to occur in the first octet (i.e., divide by L), the quotient is used to select a first constellation point from the robbed-bit constellation having K points, while the remainder is used to select a constellation point from the non-robbed-bit constellation having L points.

According to the principles of another embodiment of the invention, either by utilizing more than two constellations, or by changing the constellations which would otherwise be used, it may be possible in certain circumstances to group more than x–y bits together where y bits are to be robbed. This results in a partial compensation of the transmission speed losses incurred by the robbed bit signalling.

Additional objects and advantages of the invention will become apparent to those skilled in the art upon reference to the detailed description taken in conjunction with the provided figures.

BRIEF DESCRIPTION OF THE DRAWINGS

Appendix 1 is a listing of a preferred set of 2D constellations utilized in the mapper of FIG. 2 of the invention for a robbed bit signalling situation at 52 kbps.

Appendix 2 is a listing of a preferred set of 3D constellation utilized in the mapper of FIG. 2 of the invention for a robbed bit signalling situation at 53.333 kbps.

Appendix 3 is listing of two sets of 6D constellations utilized in the mapper of FIG. 2 of the invention for a robbed bit signalling situation at 57.333 kbps.

DETAILED DESCRIPTION OF THE PREFERRED EMBODIMENT

Figure 1:
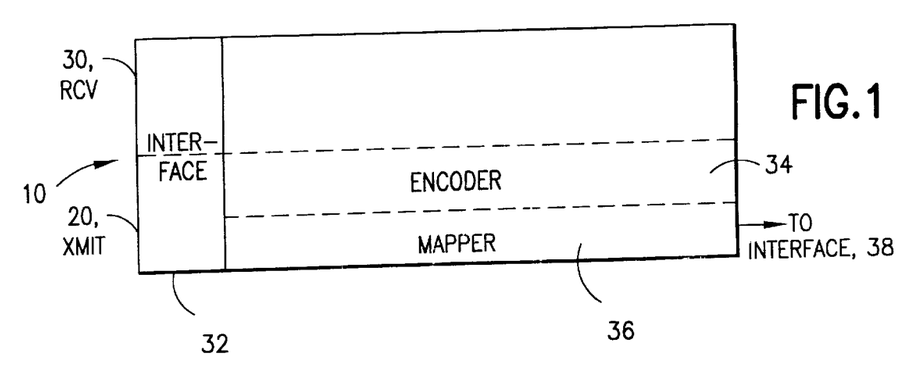
FIG. 1 is a high level block diagram of the PAM modem of the invention.

Turning to FIG. 1, a high level block diagram of a PAM modem 10 is seen. The modem 10 broadly includes a transmitter 20 and a receiver 30. The transmitter includes an interface 32 to a source of digital data (such as a computer), an encoder 34 which includes a mapper 36 and may optionally include a Trellis or convolutional encoder (not shown), and an interface 38. Details of the receiver side of the modem are well known and are not shown in FIG. 1.

For purposes of the present invention, it is assumed that the PAM modem 10 of FIG. 1 should be usable in situations where robbed bit signalling may occur. In other words, it is desirable to provide a modem which can provide data which may be transmitted over T1 trunks. For such a modem it is assumed that information is provided to the modem regarding where bits are to be robbed; i.e., a frame is determined by, or provided to the PAM modem so that the PAM modem can determine when a generated symbol will have a bit robbed. While the details of such a determination are not within the scope of the present invention, it is noted that such a determination can be made by the modem by providing test pattern signals of a known sequence during a handshake and tracking when errors which are due to robbed bits occur.

Figure 2:
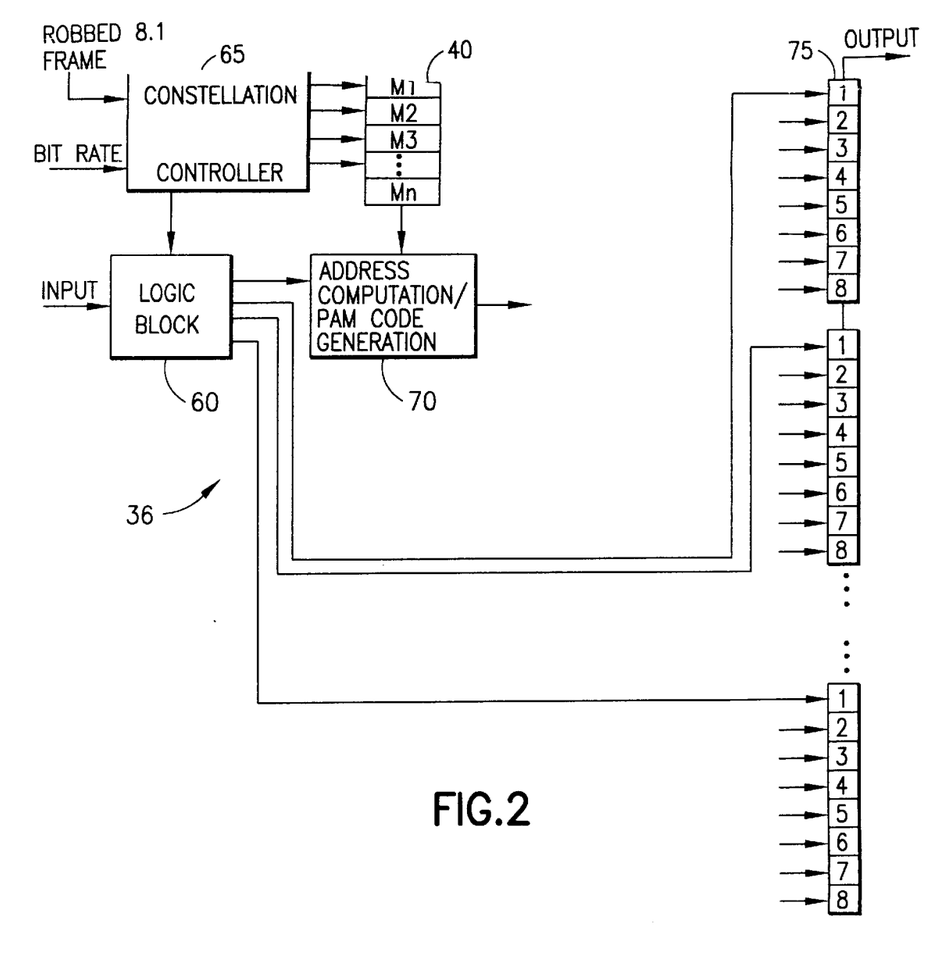
FIG. 2 is a block diagram of a mapper according to a preferred embodiment of the invention.

Turning now to FIG. 2, the preferred mapper 36 of the invention is seen to include a constellation matrix memory 40, a logic block 60 for arranging data, a constellation controller 65 coupled to the constellation matrix memory 40 for selecting a constellation from the constellation matrix memory, an address computation/PAM code generation block 70, which is coupled to the logic block 60 and to the constellation matrix memory 40, and an output register 75. According to the invention, the constellation matrix memory 40 stores indications of n constellations, including constellations of different dimensions, and constellation particularly provided for robbed bit signalling situations. Each constellation is preferably stored in an 8×16 bit memory block.

As discussed in the parent applications hereto, based on a desired data rate, the constellation controller 65 provides a frame to the logic block 60 which causes desired numbers of bits to be grouped together by the logic block 60. A subgroup of one or more bits of the grouped bits is preferably used as a sign bit or bits for outgoing octets, and the subgroup is provided to the output register 75. The remaining bits are provided to the address computation/PAM code generation block 70. Where a one-dimensional constellation is to be utilized, the value of the remaining bits is used to locate a location in an appropriate constellation (as indicated by the constellation controller 65). For example, if seven bits are grouped together, and six bits are remaining after one sign bit is provided to the output register 75, the value of the remaining six bits might be 100010=thirty-four base ten. Thus, the thirty-fourth set bit in the constellation would be indicated. The location of that thirty-fourth set bit would then be used by the address computation/PAM code generation block 70 to directly generate a seven bit PAM code word (three bits indicating which of eight rows, and four bits indicating where of the sixteen places in the row) for output to the output register 75. Along with the sign bit, the seven bit PAM code word is used to generate an octet.

Where a multidimensional constellation is to be utilized, as discussed in the parent applications hereto, more than one sign bit is utilized, and the remaining bits are used to sequentially choose more than one point in one or more multidimensional constellations. Thus, as set forth in the parent applications hereto, (and where robbed bit signalling is not of concern), for an N-dimensional constellation, x bits are grouped together (where $2^{x-N} \leq L^N$ with L=the number of positive points in the constellation). A subgroup of N bits of the x bits are used as the sign bits for the N output symbols. The value represented by a subgroup of the x–N remaining bits is then divided by $L^{N-m}$ (where m is a variable which takes values from 1 to N-1 sequentially) to obtain quotients and remainders. The first quotient is used to select a first constellation point value (indication) which is used to generate a code value output. If N–m equals one, the first remainder is used to select another constellation point indication. However, if N–m is greater than one, m is increased by one, and the remainder is divided by $L^{N-m}$ to obtain a second quotient and a second remainder, with the second quotient being used to select a second constellation point value. If N–m is equal to one, the second remainder is used to select a third constellation point value; otherwise, m is again increased and the remainder divided by $L^{N-m}$. The process is continued until N–m equals one, and the last remainder is used to select the N'th constellation point value.

Through the use of 2D, 3D, 4D, 6D, and 8D constellations alone, or in conjunction with each other and in conjunction with 1D constellations, many different bit rates can be obtained while maintaining desirable minimum distances and power. It should be appreciated however, as discussed above, that where robbed bit signalling is of concern, the preferred method of choosing constellation points is preferably altered. Thus, according to one embodiment of the invention, where one or more bits are to be robbed, instead of grouping together x bits, the logic block 60 is instructed by the constellation controller 65 to group x–y bits together, where y is the number of bits to be robbed in a frame (or subframe) of symbols. From the x–y bits, preferably, a group of N bits are used as sign bits. The remaining x–y–N bits are then used to choose points in more than one multidimensional constellation. Thus, the multidimensional constellations are chosen so that $2^{x-y-N} \leq (L^{N-y})(K^y)$ with L=the number of positive points or indications in the first multidimensional constellation, and K=the number of positive points or indications in the second multidimensional constellation. In order to choose points from the constellations, the value represented by the x−y−N remaining bits are divided by $(L^{N-y-m})(K^{y-p})$ as discussed below with respect to certain examples, where m is a variable which takes values from either 0 or 1 to N−y−1 sequentially, and where p is a variable which takes the value from either 0 or 1 to y−1 sequentially, to obtain quotients and remainders. Whether m or p is incremented is dependent upon the sequence of the octets to be generated; i.e., from which generated octet a bit is to be robbed. Each quotient is used to choose a point from one or the other of the multidimensional constellations depending upon whether m or p was incremented. It should be noted that where N−y−m is zero, division will only be by $K^{y-p}$. Similarly, it should be noted that the robbed bit divisor $(L^{N-y-m})(K^{y-p})$ reduces to the divisor $L^{N-m}$ discussed above where no bits are to be robbed; i.e., y=0.

Utilizing the preferred method of generating quotients and a final remainder for choosing constellation points, certain rules are preferably provided. Thus, both m and p are non-negative integers, and the sum of initial value of m and p should equal one. Where it is determined that a first octet which is to be generated by the mapper will eventually have a bit robbed from it, p is initially set to one (m=0). Conversely, where it is determined that the first octet will not have a bit robbed from it, m is initially set to one (p=0). Also, when an octet is being generated which will not be subjected to being robbed of a bit, then m is incremented by 1, whereas when an octet is being generated which will be subjected to being robbed of a bit, p is incremented by 1. As a result, m and p are not incremented simultaneously.

In the case of the use of a 2D constellation, where a single bit is being robbed, it will be appreciated that N−y−m will be either zero or one (depending upon whether the first or the second octet is to have a robbed bit), so that the value of the x−y−N bits will be divided by L or K to obtain a first quotient and a first remainder. Where the value x−y−N is divided by K (i.e., m=1, p=0), the resulting quotient is used to select a first constellation point from the first ("non-robbed-bit") constellation having L points while the remainder is used to select another constellation point from the second ("robbed-bit") constellation having K points. Conversely, where the value x−y−N is divided by L (i.e., m=0, p=1), the resulting quotient is used to select a first constellation point from the robbed-bit constellation having K points, while the remainder is used to select a second constellation point from the non-robbed-bit constellation having L points.

An example of a pair of two-dimensional constellations useful in robbed bit signalling is seen with respect to Appendix 1, where a ninety-two point (forty-six positive points) "non-robbed-bit" 2D constellation with Dmin=32 is provided, as well as a forty-eight point (twenty-four positive points) "robbed-bit" 2D constellation with Dmin=32. The ninety-two point 2D constellation is particularly useful in transmitting 52 kbps (6.5 bits/symbol) in the absence of robbed bit signalling, with thirteen bits being grouped together; two for sign bits, and eleven for choosing two points in the ninety-two point 2D constellation (it being appreciated that $2^{11}<46^2$). However, with robbed bit signalling, only twelve bits are grouped together rather than thirteen. Two of the twelve bits are used as sign bits with the other ten for choosing two points; one from the ninety-two point 2D constellation, and the other from the forty-eight point 2D constellation (it being noted that $2^{10}<46\times24$). Thus, using the robbed bit algorithm for dividing the digital value of the ten bits by $(L^{N-y-m})(K^{y-p})$, if m=1, the resulting quotient is used to select one of the forty-six positive points in the non-robbed-bit ninety-two point 2D constellation, and the remainder is used to select one of the twenty-three positive points in the robbed-bit forty-eight point 2D constellation.

An example of a pair of three-dimensional constellations useful in robbed bit signalling is seen with respect to Appendix 2, where a one hundred and two point (fifty-six positive points) non-robbed bit 3D constellation with Dmin=20 (Power=−12.0 dBm) is provided, as well as a fifty-two point (twenty-six positive points) "robbed-bit" 3D constellation with Dmin=24 (P=−12.4 dBm). The one hundred and two point 3D constellation is particularly useful in transmitting 53.333 kbps (6.666 bits/symbol) in the absence of robbed bit signalling, with twenty bits being grouped together; three for sign bits, and seventeen for choosing three points in the one hundred and two point 3D constellation (it being appreciated that $2^{17}<51^3$). However, with robbed bit signalling, depending upon how many bits (y) are to be robbed from the three symbols (one, two, or three bits), only nineteen, eighteen, or seventeen bits (20−y) are grouped together rather than twenty, with resulting average decreased bit rates of 50.667 kbps, 48 kbps, and 45.333 kbps. Three of those bits are used as sign bits with the remaining bits used for choosing three points; one, two or three from the one hundred-two point 3D constellation, and three, two, or one from the fifty-two point 3D constellation (it being noted that $2^{16}<51\times51\times26$, $2^{15}<51\times26\times26$, and $2^{14}<26\times26\times26$). Thus, if one bit is to be robbed, using the preferred robbed bit algorithm for dividing the value of the sixteen bits by $(L^{N-y-m})(K^{y-p})$, the value is divided first by 51×26 (N−y−m=1, and y−p=1), and then by 26 (N−y−m=0, and y−p=1) in order to provide two quotients which are used to point to two indications in the first (102 point) non-robbed-bit constellation ("A" constellation), and a remainder which is used to point to an indication in the second (52 point) robbed-bit or "B" constellation. It should be appreciated that if instead of an "A,A,B" pattern where the robbed bit is robbed from the third generated octet, an "A,B,A" pattern is required with the robbed bit being robbed from the second generated octet, the divisors would be ordered differently, as p would be incremented instead of m. Thus, the first divisor would be 51×26 and provide a quotient which pointed to constellation A, and the second divisor would be 51 which would provide a quotient which would point to constellation B, with a remainder that could be larger than 26 and which would point to constellation A.

Using the same 3D constellations, if two bits are to be robbed, if m=1, the value represented by the remaining fifteen bits is divided by 26×26 (N−y−m=0, and y−p=2) to provide a quotient as large as fifty-one which points to constellation A. The remainder is then divided by 26 (y−p=1) to provide a second quotient and a remainder which both point to constellation B; thereby providing an A,B,B pattern. Of course, as discussed above, different patterns can be accommodated by initially setting p=1 and m=0, and by incrementing p or m differently.

If three bits are to be robbed, the value of the remaining fourteen bits are divided by 26×26 to provide a quotient ≦26 which points to constellation B; and the remainder is divided by 26 to obtain another quotient and a remainder which both point to constellation B.

Turning now to Appendix 3, a one hundred forty-four point (seventy-two positive points) 6D constellation with Dmin=8 (Power=−12.2 dBm) is provided which is particularly useful in sending 7.1666 bits per symbol (57.333 kbps) in the absence of robbed bit signalling. The combination of the same 144 point non-robbed-bit constellation as well as an accompanying seventy-two (thirty-six positive points) "robbed-bit" 6D constellation with Dmin=10 (P=−12.2 dBm) is particularly useful for robbed bit signalling situations. In the absence of robbed bit signalling forty-three bits are grouped together, with six bits used for sign bits, and the remaining thirty-seven bits used to choose six points in the one hundred and forty-four point 6D constellation (it being appreciated that $2^{37} < 72^6$). However, with robbed bit signalling, depending upon how many bits (y) are to be robbed from the six symbols (one, two, three, or four bits), only forty-two, forty-one, forty, or thirty-nine (43−y) are grouped together rather than forty-three, with resulting average decreased bit rates of 56 kbps, 54.667 kbps, 53.333 kbps, and 52 kbps. Six of those bits are used as sign bits with the remaining bits used for choosing six points; with anywhere between two and five chosen from the one hundred forty-four point 6D constellation, and anywhere between four and one chosen from the seventy-two point 6D constellation. Thus, if one bit is to be robbed, using the preferred robbed bit algorithm for dividing the value of the forty-two bits by $(L^{N-y-m})$ $(K^{y-p})$, and setting m=1, the value is divided first by $36 \times 72^4$, (N−y−m=4, and y−p=1), and then by $36 \times 72^3$ (N−y−m=3, and y−p=1), and then by $36 \times 72^2$ (N−y−m=2, and y−p=1), and then by $36 \times 72$ (N−y−m=1, and y−p=1), and then by 36 (N−y−m=0, and y−p=1) to provide five quotients used to select points from the 144 point "A" constellation, and a remainder which is used to select a point from the 72 point "B" constellation. Of course, as discussed above with reference to other constellations, if the robbed bit locations required a change in the constellation pattern from A,A,A,A,A,B, the sequence of divisors could be correspondingly changed to accomplish the desired results.

As indicated in Appendix 3, where two, three, or four bits are robbed, using the same preferred algorithm, the divisors are changed, and one or more quotients as well as the final remainder are used to select points from the "B" constellation.

According to the principles of another embodiment of the invention, by changing the constellations which would otherwise be used, it may be possible in certain circumstances to group more than x−y bits together where y bits are to be robbed. In particular, and with respect to Appendix 3, a second set of 6D constellations are shown, including a 160 point 6D constellation (Dmin=8, P=−12.25 dBm) and a 82 point 6D constellation (Dmin=8, P=−11.96 dBm). With this second set of 6D average power minimums of −12 dBm are maintained, as is the minimum distance of eight. However, with this second set of 6D constellations, the average bit rate can be increased in the presence of two or more robbed bits per six symbols. Thus, where one bit is to be robbed over the six generated octet symbols, only forty-two bits are grouped together, with six bits used as sign bits, and the remaining thirty-seven bits used to select six points: five from the 160 point 6D constellation, and one from the 82 point 6D constellation. The sequence of divisors (m initially set to 1) would be $41 \times 80^4$, $41 \times 80^3$, $41 \times 80^2$, $41 \times 80$, 41. However, where two bits are to be robbed, forty-two bits are still grouped together, as $80^4 \times 41^2 > 2^{35}$. The sequence of divisors for the two robbed bit situation would be $41^2 \times 80^3$, $41^2 \times 80^2$, $41^2 \times 80$, $41^2$, 41. According to this embodiment of the invention, while the algorithm for determining divisors in order to obtain quotients and remainders remains unchanged, the number of bits grouped together will not always be x−y.

With further reference to Appendix 3, it is noted that while the 160 point and 82 point 6D constellation pair could be utilized instead of the 144 point and 72 point 6D constellation pair to handle all robbed bit situations, there are some advantages to using the latter constellation pair where a single robbed bit or no robbed bits will occur in a certain set of six symbols, and using the former constellation pair where two, three or four bits are to be robbed during the six symbols. In particular, as seen in Appendix 3, with no robbed bits, or a single robbed bit, the minimum distance Dmin=8 occurs with less frequency when the latter pair of constellations is utilized as opposed to when the former pair of constellations is utilized; (e.g., 8–10% of the time as opposed to 27–31% of the time). While, the frequency of the minimum distance is also less for the latter constellation pair for two, three and four robbed bits (between 3% and 6% as opposed to between 22% and 26%), the increased data rates of the former constellation pair generally favor the use of the former constellation pair for these situations.

According to yet another aspect of the invention, partial compensation of the transmission speed losses incurred by robbed bit signalling may be obtained by coding the points of a multidimensional constellation out of order; i.e., in a non-sequential manner. As discussed above, in certain circumstances, if two or more bits are to be robbed from octets being coded together from one or more multidimensional constellations, the number of bits initially grouped together does not have to be decreased by the same number of bits being robbed. However, as discussed above, if a single bit (y=1) is being robbed from octets being coded together, the number of bits being initially grouped together is reduced by one. According to this aspect of the invention, therefore, points of a multidimensional constellation are coded out of order so that robbed bits from two groups of octets are coded together in order to partially compensate for transmission speed losses. For example, if bits are grouped together for choosing points from one or more 3D constellations, a typical situation might call for a robbed bit (RB) from a first octet, and no robbed bits from the second and third octets. This frame may be repeated: RB - -, RB - -, RB, . . . According to this aspect of the invention, the coding is altered so that the first 3D constellation includes the first, second and fourth slots, while the second 3D constellation will include the third, fifth and sixth slots, thereby incorporating two robbed bits into one 3D constellation, and no robbed bits into the other 3D constellation. The three octets with two robbed bits may then be coded utilizing a particular constellation where two robbed bits can be accommodated with the "loss" of only a single bit; i.e., the number of bits grouped together is decreased by one instead of two. It should be appreciated that this concept may be extended such that more than two groups of three octets (or more octets for higher dimensions) are grouped together in order to locate robbed bits together for coding purposes.

Those skilled in the art will appreciate that demappers according to the invention use techniques corresponding substantially to the opposite of the mapping techniques.

There have been described and illustrated herein apparatus and methods for the mapping of data in a high data rate modem. While particular embodiments of the invention have been described, it is not intended that the invention be limited exactly thereto, as it is intended that the invention be as broad in scope as the art will permit. Thus, while the invention has been described with respect to certain hardware, it will be appreciated that various functions can be carried in different hardware and/or software. Indeed, the invention has application to both analog and digital transport types of modems. In addition, while particular constellations stored in constellation matrix memory were described as being preferred, it will be appreciated that other constellations, and other pairs of constellations could be utilized. In fact, in certain circumstances, groups of three or more constellations could be utilized together. Similarly, more than two pairs or groups of constellations could be used together for optimization purposes. Further, while the invention was described with respect to grouping and using sign bits separately and providing constellations with indications of positive points only, it will be appreciated that the memory for storing the constellations could be doubled in size to store indications of negative points, so that the sign bits would not be dealt with separately. Therefore it will be apparent to those skilled in the art that other changes and modifications may be made to the invention as described in the specification without departing from the spirit and scope of the invention as so claimed.

APPENDIX 1

RB-symbol Transmission at 2D Constellations (52 kbps, 6.5 bit/symbol, 92-point 2D Constellation)

1. Special 2D constellation for RB transmission.

Let's consider the existing 2D 92-point constellation used for 52 kbps data rate:

92-point constellation with Dmin=32 (54 points=0.58), P=−11.9 dBm:

$S_1$ = [0,0,0,0,0,0,0,0,1,0,0,0,0,0,0,0]; (A)
$S_2$ = [0,0,0,0,1,0,0,0,0,0,0,1,0,0,0];
$S_3$ = [0,0,1,0,0,0,1,0,0,0,1,0,0,0,1,0];
$S_4$ = [0,1,0,1,0,1,0,1,0,1,0,1,0,1,0,1];
$S_5$ = [0,1,1,1,1,1,1,1,1,1,1,1,1,1,1,1];
$S_6$ = [1,1,1,1,1,1,1,1,1,1,1,1,1,1,1,1];
$S_7$ = [0,0,0,0,0,0,0,0,0,0,0,0,0,0,0,0];
$S_8$ = [0,0,0,0,0,0,0,0,0,0,0,0,0,0,0,0];

Now let's combine a reduced. generating constellation for RB-symbol, having the same minimum distance 32:

48-point reduced generating constellation $z_1$ = [0,0,0,0,0,0,0,0,0,1,0,0,0,0,0,0]; (B)
$z_2$ = [0,0,0,0,0,0,0,1,0,0,0,0,0,0,0,0];
$z_3$ = [0,1,0,0,0,0,0,1,0,0,0,0,0,1,0,0];
$z_4$ = [0,0,0,1,0,0,0,1,0,0,0,1,0,0,0,1];
$z_5$ = [0,0,0,1,0,1,0,1,0,1,0,1,0,1,0,1];
$z_6$ = [0,1,0,1,0,1,0,1,0,1,0,1,0,1,0,1];
$z_7$ = [0,0,0,0,0,0,0,0,0,0,0,0,0,0,0,0];
$z_8$ = [0,0,0,0,0,0,0,0,0,0,0,0,0,0,0,0];

The RB transforms this constellation as follows:

48-point constellation with RB shift, Dmin=32 (14 points=0.29), P=−12.1 dBm:

$z_1$ = [0,0,0,0,0,0,0,0,1,1,0,0,0,0,0,0]; (C)
$z_2$ = [0,0,0,0,0,0,1,1,0,0,0,0,0,0,0,0];
$z_3$ = [1,1,0,0,0,0,1,1,0,0,0,0,1,1,0,0];
$z_4$ = [0,0,1,1,0,0,1,1,0,0,1,1,0,0,1,1];
$z_5$ = [0,0,1,1,1,1,1,1,1,1,1,1,1,1,1,1];
$z_6$ = [1,1,1,1,1,1,1,1,1,1,1,1,1,1,1,1];
$z_7$ = [0,0,0,0,0,0,0,0,0,0,0,0,0,0,0,0];
$z_8$ = [0,0,0,0,0,0,0,0,0,0,0,0,0,0,0,0];

APPENDIX 2

RB-symbol Transmission at 3D Constellations (53.333 kbps, 6.6667 bit/symbol, 102-point 3D Constellation, Dmin=20)

A basic constellation for this case is 102-point 3D, 6.66(6) bit per symbol, 53.33(3) kbps, Dmin=20 (4 points=0.04), P=−12.0 dBm $h_1$ = [0,0,0,0,0,0,1,0,0,0,0,0,0,0,0]; (A)
$h_2$ = [0,1,0,0,0,0,1,0,0,0,0,1,0,0,0,0];
$h_3$ = [1,0,0,1,0,0,1,0,0,1,0,0,1,0,0,1];
$h_4$ = [0,1,0,1,0,1,0,1,0,1,0,1,0,1,0,1];
$h_5$ = [1,1,1,1,1,1,1,1,1,1,1,1,1,1,1,1];
$h_6$ = [1,1,1,1,1,1,1,1,1,1,1,1,1,1,1,1];
$h_7$ = [1,0,0,0,0,0,0,0,0,0,0,0,0,0,0,0];
$h_8$ = [0,0,0,0,0,0,0,0,0,0,0,0,0,0,0,0];

A reduced generating constellation for RB transmission is $z_1$ = [0,0,0,0,0,0,0,1,0,0,0,0,0,0,0,0]; (B)
$z_2$ = [0,0,0,1,0,0,0,0,0,0,1,0,0,0,0,0];
$z_3$ = [0,0,0,1,0,0,0,1,0,0,0,1,0,0,0,1];
$z_4$ = [0,0,0,0,1,0,0,0,1,0,0,0,1,0,0,0,1];
$z_5$ = [0,0,0,1,0,1,0,1,0,1,0,1,0,1,0,1];
$z_6$ = [0,1,0,1,0,1,0,1,0,1,0,1,0,1,0,1];
$z_7$ = [0,0,0,0,0,0,0,0,0,0,0,0,0,0,0,0];
$z_8$ = [0,0,0,0,0,0,0,0,0,0,0,0,0,0,0,0];

The RB transforms constellation (B) into the following constellation:

52-point RB shifted constellation, Dmin=24 (8 points=0.15), P=−12.4 dBm $z_1$ = [0,0,0,0,0,0,1,1,0,0,0,0,0,0,0,0]; (C)
$z_2$ = [0,0,1,1,0,0,0,0,0,1,1,0,0,0,0];
$z_3$ = [0,0,1,1,0,0,1,1,0,0,1,1];
$z_4$ = [0,0,1,1,0,0,1,1,0,0,1,1,0,0,1,1];
$z_5$ = [0,0,1,1,1,1,1,1,1,1,1,1,1,1,1,1];
$z_6$ = [1,1,1,1,1,1,1,1,1,1,1,1,1,1,1,1];
$z_7$ = [0,0,0,0,0,0,0,0,0,0,0,0,0,0,0,0];
$z_8$ = [0,0,0,0,0,0,0,0,0,0,0,0,0,0,0,0];

Examples:

| Number of the RB in the constellation | 0 | 1 | 2 | 3 |
|---|---|---|---|---|
| Number of information bits in the constellation | 20 | 19 | 18 | 17 |
| Average Bit/Symbol | 6.667 | 6.333 | 6 | 5.667 |
| Information bit rate | 53.333 | 50.667 | 48 | 45.333 |
| Dmin | 20(4%) | 20(3%) | 20(1%) | 24(15%) |
| Constellation Pattern | A,A,A | A,A,B | A,B,B | B,B,B |
| Divisors of the computation algorithm | 51×51,51 | 51×26,26 | 26×26,26 | 26×26,26 |

APPENDIX 3

RB-symbol Transmission at 6D Constellation (57.333 kbps, 7.1667 bit/symbol, 144-point 6D Constellation, $D_{min}$=8)

A basis constellation for this case is 144-point 6D constellation for 7.1666 bit per symbol (57.333 kbps), Dmin=8 (14 points=0.10), P=12.2 dBm $h_1$ = [0,0,0,1,0,0,0,0,1,0,0,0,0,1,0,0]; (A)
$h_2$ = [0,1,0,0,1,0,0,1,0,0,1,0,0,1,0,0];
$h_3$ = [1,1,1,1,1,1,1,1,0,1,0,1,0,1,0,1];
$h_4$ = [1,1,1,1,1,1,1,1,1,1,1,1,1,1,1,1];
$h_5$ = [1,1,1,1,1,1,1,1,1,1,1,1,1,1,1,1];
$h_6$ = [1,1,1,1,1,1,1,1,1,1,1,1,1,1,1,1];
$h_7$ = [1,1,1,1,0,0,0,0,0,0,0,0,0,0,0,0];
$h_8$ = [0,0,0,0,0,0,0,0,0,0,0,0,0,0,0,0];

When using one RB within the 6-symbol frame, we can transmit 43−1=42 information bits Subtracting 6 sign bits, we will get 36 bits. To transmit 36-bit block we need 5 of 72-point constellation (we mean number of positive points) and 1 of 36-point constellation because $72^5 \times 36 = 6.9657e+010 > 2^{36} = 6.8719e+010$.

A reduce 72-point generating constellation for RB transmission is $$z1 = [0,0,0,0,0,1,0,0,0,0,0,1,0,0,0,0]; \quad (B)$$
$$z2 = [0,1,0,0,0,1,0,0,0,1,0,0,0,1,0,0];$$
$$z3 = [0,1,0,0,0,1,0,0,0,1,0,0,0,1,0,0];$$
$$z4 = [0,1,0,1,0,1,0,1,0,1,0,1,0,1,0,1];$$
$$z5 = [0,1,0,1,0,1,0,1,0,1,0,1,0,1,0,1];$$
$$z6 = [0,1,0,1,0,1,0,1,0,1,0,1,0,1,0,1];$$
$$z7 = [0,1,0,1,0,0,0,0,0,0,0,0,0,0,0,0];$$
$$z8 = [0,0,0,0,0,0,0,0,0,0,0,0,0,0,0,0];$$

The RB transforms constellation (B) into the following constellation: 72-point RB shifted constellation, Dmin=10 (2 points=0.03), P=−12.2 dBm $$z1 = [0,0,0,0,1,1,0,0,0,0,1,1,0,0,0,0]; \quad (C)$$
$$z2 = [1,1,0,0,1,1,0,0,1,1,0,0,1,1,0,0];$$
$$z3 = [1,1,0,0,1,1,0,0,1,1,0,0,1,1,0,0];$$
$$z4 = [1,1,1,1,1,1,1,1,1,1,1,1,1,1,1,1];$$
$$z5 = [1,1,1,1,1,1,1,1,1,1,1,1,1,1,1,1];$$
$$z6 = [1,1,1,1,1,1,1,1,1,1,1,1,1,1,1,1];$$
$$z7 = [1,1,1,1,0,0,0,0,0,0,0,0,0,0,0,0];$$
$$z8 = [0,0,0,0,0,0,0,0,0,0,0,0,0,0,0,0];$$

An example of the use of constellation (A) and (B) for mapping at various number of the RB is present in Tables 1 & 2.

increase a number of points of the corresponding constellations within the −12 dBm power restriction. For example, we can use the following constellations (D) and (E), having 160 and 82 points, correspondingly:

160-point constellation, $D_{min}=8$ (50 points=0.31), P=−12.25 dBm $$h1 = [0,0,1,0,0,0,1,0,0,0,1,0,0,0,1,0]; \quad (D)$$
$$h2 = [0,1,0,1,0,1,0,1,0,1,0,1,0,1,0,1];$$
$$h3 = [0,1,1,1,1,1,1,1,1,1,1,1,1,1,1,1];$$
$$h4 = [1,1,1,1,1,1,1,1,1,1,1,1,1,1,1,1];$$
$$h5 = [1,1,1,1,1,1,1,1,1,1,1,1,1,1,1,1];$$
$$h6 = [1,1,1,1,1,1,1,1,1,1,1,1,1,1,1,1];$$
$$h7 = [1,1,1,1,1,0,0,0,0,0,0,0,0,0,0,0];$$
$$h8 = [0,0,0,0,0,0,0,0,0,0,0,0,0,0,0,0];$$

82-point generating constellation $$z1 = [0,0,0,1,0,0,0,0,0,1,0,0,0,0,0,1]; \quad (E)$$
$$z2 = [0,0,0,1,0,0,0,1,0,0,0,1,0,0,0,1];$$
$$z3 = [0,0,0,1,0,1,0,1,0,1,0,1,0,1,0,1];$$
$$z4 = [0,1,0,1,0,1,0,1,0,1,0,1,0,1,0,1];$$
$$z5 = [0,1,0,1,0,1,0,1,0,1,0,1,0,1,0,1];$$
$$z6 = [0,1,0,1,0,1,0,1,0,1,0,1,0,1,0,1];$$
$$z7 = [0,1,0,1,0,1,0,0,0,0,0,0,0,0,0,0];$$
$$z8 = [0,0,0,0,0,0,0,0,0,0,0,0,0,0,0,0];$$

TABLE 1

Example 1

| Number of the RB in a 6-symbol frame | 0 | 1 | 2 | 3 | 4 |
|---|---|---|---|---|---|
| Number of information bits in a 6-symbol frame | 43 | 42 | 41 | 40 | 39 |
| Average bit/symbol | 7.167 | 7 | 6.833 | 6.667 | 6.5 |
| Information bit rate | 57.333 | 56 | 54.667 | 53.333 | 52 |
| Dmin | 8(10%) | 8(8%) | 8(6%) | 8(5%) | 8(3%) |
| Constellation pattern | A,A,A,A,A,A | A,A,A,A,A,B | A,A,A,A,B,B | A,A,A,B,B,B | A,A,B,B,B,B, |

TABLE 2

Computation Algorithm for Example 1

| Number of RB | Sequence of Divisors |
|---|---|
| 0 | $72^5, 72^4, 72^3, 72^2, 72$ |
| 1 | $36 \times 72^4, 36 \times 72^3, 36 \times 72^2, 36 \times 72, 36$ |
| 2 | $36^2 \times 72^3, 36^2 \times 72^2, 36^2 \times 72, 36^2, 36$ |
| 3 | $36^3 \times 72^2, 36^3 \times 72, 36^3, 36^2, 36$ |
| 4 | $36^4 \times 72, 36^4, 36^3, 36^2, 36$ |

In the above example (Tables 1 & 2) we lose information bits when transmitting robbed bits, and a number of lost bits is equal to a number of the RB within a frame. However, in principle, multidimensional constellations allow us to reduce a number of lost bits. Below we demonstrate that opportunity by the same example we have considered.

In the above example we have used 144-point constellation (A) and 72-point constellation (B) that have Dmin=8 & 10, respectively. But when using Dmin=8, it is possible to 82-point RB-shifted constellation, Dmin=8 (14 points= 0.17), P=−11.96 dBm $$z1 = [0,0,1,1,0,0,0,0,1,1,0,0,0,0,1,1];$$
$$z2 = [0,0,1,1,0,0,1,1,0,0,1,1,0,0,1,1];$$
$$z3 = [0,0,1,1,1,1,1,1,1,1,1,1,1,1,1,1];$$
$$z4 = [1,1,1,1,1,1,1,1,1,1,1,1,1,1,1,1];$$
$$z5 = [1,1,1,1,1,1,1,1,1,1,1,1,1,1,1,1];$$
$$z6 = [1,1,1,1,1,1,1,1,1,1,1,1,1,1,1,1];$$
$$z7 = [1,1,1,1,1,1,0,0,0,0,0,0,0,0,0,0];$$
$$z8 = [0,0,0,0,0,0,0,0,0,0,0,0,0,0,0,0];$$

The use of constellations (D) and (E) enable to decrease by 1 bit the information loss in case of 4-, 3-, and 2-RB transmissions, because $80*80*41*41*41=1.8085e+010>2^{(37-3)}=1.7180e=010;$ $80*80*80*41*41*41=3.5288e+010>2^{(37-2)}=3.4360e=010;$ $80*80*80*80*41*41=6.8854e+010>2^{(37-1)}=6.8719e=010;$ Tables 3 and 4 demonstrate the corresponding results.

TABLE 3

Example 2

| Number of the RB in a 6-symbol frame | 0 | 1 | 2 | 3 | 4 |
|---|---|---|---|---|---|
| Number of information bits in a 6-symbol frame | 43 | 42 | 42 | 41 | 40 |
| Average bit/symbol | 7.167 | 7 | 7 | 6.833 | 6.667 |
| Information bit rate | 57.333 | 56 | 56 | 54.667 | 53.333 |
| Dmin | | | | | |
| Option 1 | 8(10%) | 8(8%) | 8(26%) | 8(24%) | 8(22%) |
| Option 2 | 8(31%) | 8(27%) | 8(26%) | 8(24%) | 8(22%) |
| Constellation pattern | | | | | |
| Option 1 | A,A,A,A,A,A | A,A,A,A,A,B | O,D,D,D,E,E | D,D,D,E,E,E | D,D,E,E,E,E |
| Option 2 | D,D,D,D,D,D | D,D,D,D,D,E | O,D,D,D,E,E | D,D,D,E,E,E | D,D,E,E,E,E |

TABLE 4

Computation Algorithm for Example 2 (Option 1)

| Number of RB | Sequence of Divisors |
|---|---|
| 0 | $72^5, 72^4, 72^3, 72^2, 72$ |
| 1 | $36 \times 72^4, 36 \times 72^3, 36 \times 72^2, 36 \times 72.36$ |
| 2 | $41^2 \times 80^3, 41^2 \times 80^2, 41^2 \times 80, 41^2, 41$ |
| 3 | $41^3 \times 80^2, 41^3 \times 80, 41^3, 41^2, 41$ |
| 4 | $41^4 \times 80, 41^4, 41^3, 41^2, 41$ |

Having compared Tables 1 and 3, we can see that in Example 2 the information bit rate is greater than in Example 1 when it is transmitted 2, 3, or 4 Robbed Bits. This result is achieved by means of extended 6D constellations (D) and (E).

We claim:

1. A PAM mapper coupled to telecommunications equipment utilizing robbed bit signalling, said PAM mapper comprising:
   a) a constellation matrix memory means for storing indications of a plurality of different multidimensional PAM constellations having different numbers of constellation points;
   b) means for receiving and storing incoming bits and for grouping the incoming bits into a group of bits based on a transmission data rate and based on a presence of robbed bit signalling; and
   c) code generation means coupled to said means for receiving and storing and to said constellation matrix memory means, said code generation means for receiving at least a plurality of said group of bits, for using said plurality of said group of bits to identify N indications of constellation points in at least one selected of said plurality of multidimensional PAM constellations, and for generating N PAM output codes based on said indications, where N is an integer greater than one.

2. A mapper according to claim 1, wherein:
said code generation means includes means for dividing a value of said plurality of said group of bits by $L^{N-y-m} K^{y-p}$ where L is a positive integer representing the number of positive points in a first of said multidimensional constellations, K is a positive integer representing the number of positive points in a second of said multidimensional constellations, m and p are dummy variables, and y is a variable related to a number of bits which are to be robbed with respect to said N PAM output codes.

3. A mapper according to claim 2, wherein:
said means for dividing a value determines a quotient which is used to identify a first of said N indications, and a first remainder.

4. A mapper according to claim 3, wherein:
N=2, and said code generation means includes means for using said first remainder to identify a second of said N indications, said quotient and said first remainder identifying indications from different of said multidimensional constellations.

5. A mapper according to claim 3, wherein:
N>2, and said means for dividing determines a second quotient and a second remainder by dividing said first remainder by $L^{N-y-m} K^{y-p}$, said second quotient is used to identify a second of said N indications.

6. A mapper according to claim 3, wherein:
N>2, and said means for dividing determines a plurality of quotients and a remainder by dividing said first remainder.

7. A mapper according to claim 2, wherein:
N>2, and said means for dividing a value determines N-1 quotients and a final remainder by repetitively dividing a value of said plurality of bits and interim remainders by $L^{N-y-m} K^{y-p}$ while each time incrementing either y or p, said N-1 quotients and said final remainder being used by said code generation means for identifying N indications, at least two of said N indications being from two different of said multidimensional constellations.

8. A mapper according to claim 1, further comprising:
control means coupled to said means for receiving, storing, and grouping, for sequentially indicating to said means for receiving, storing, and grouping how many bits are to be grouped together, wherein specific of said plurality of PAM constellations are sequentially utilized based on how many bits are grouped together.

9. A mapper according to claim 8, wherein:
said control means for sequentially indicating, indicates how many bits are to be grouped together based on how many bits are being robbed with respect to said N PAM output codes.

10. A method for mapping a plurality of incoming bits into PAM code outputs, comprising:
   a) grouping a plurality of said incoming bits into a group of x–y bits based on a desired data rate, and based on a presence of robbed bit signalling, x being a positive integer greater than four;
   b) using at least a plurality of said x–y bits for choosing N indications from a plurality of N-dimensional constellations, N being an integer greater than 1;

c) utilizing said N indications to choose N PAM code values.

11. A method according to claim 10, wherein:

y is the number of bits robbed with respect to said N PAM code values.

12. A method according to claim 10, wherein:

y is less than the number of bits robbed with respect to said N PAM code values.

13. A method according to claim 10, wherein:

said step of using at least a plurality of said x-y bits comprises repetitively dividing a value represented by a plurality of said x-y bits and interim remainders by $L^{N-y-m} K^{y-p}$, where m and p are dummy variables, L is a positive integer representing the number of positive points in a first of said N-dimensional constellations, K is a positive integer representing the number of positive points in a second of said N-dimensional constellations, to obtain at least one quotient and a final remainder, wherein a first of said at least one quotient is used to select a first of said indications and said final remainder is used to select another of said indications.

14. A method according to claim 13, wherein:

at least one of said indications is chosen from a first non robbed-bit constellation of said plurality of N-dimensional constellations, and at least a second of said indications is chosen from a robbed-bit constellation of said plurality of N-dimensional constellations.

15. A method according to claim 14, wherein:

m and p are non-negative variables, initially, m+p=1, and m takes values from 0 or 1 to N-y-1 sequentially, and p takes the value from 0 or 1 to y-1 sequentially.

16. A method according to claim 15, wherein:

p is initially set to one and m is initially set to zero when a first of said N PAM code values will have a bit robbed from it, and m is initially set to one and p is initially set to zero when a first of said N PAM code values will not have a bit robbed from it.

\* \* \* \* \*